July 31, 1923.

H. C. ROESER 1,463,373

NAVIGATING INSTRUMENT

Filed Sept. 5, 1919

Inventor
Harry C. Roeser

By Mason Fenwick Lawrence,
Attorneys

Patented July 31, 1923.

1,463,373

UNITED STATES PATENT OFFICE.

HARRY C. ROESER, OF CHICAGO, ILLINOIS.

NAVIGATING INSTRUMENT.

Application filed September 5, 1919. Serial No. 321,858.

*To all whom it may concern:*

Be it known that I, HARRY C. ROESER, a citizen of the United States, residing at Chicago, in the county of Cook and State of Illinois, have invented certain new and useful Improvements in Navigating Instruments; and I do hereby declare the following to be a full, clear, and exact description of the invention, such as will enable others skilled in the art to which it appertains to make and use the same.

This invention relates to navigating instruments and particularly to compass cards and devices in conjunction therewith.

The instrument herein described has for its object and purpose the determining of the true course of a ship in navigating from one point to another, making a correction of error, and also giving the correct compass point of a course. A further object is the simplifying and rendering more efficient the operation of a navigator's protractor and compass card, and of improving instruments for such purposes.

Referring to the drawings.

Figure 1:
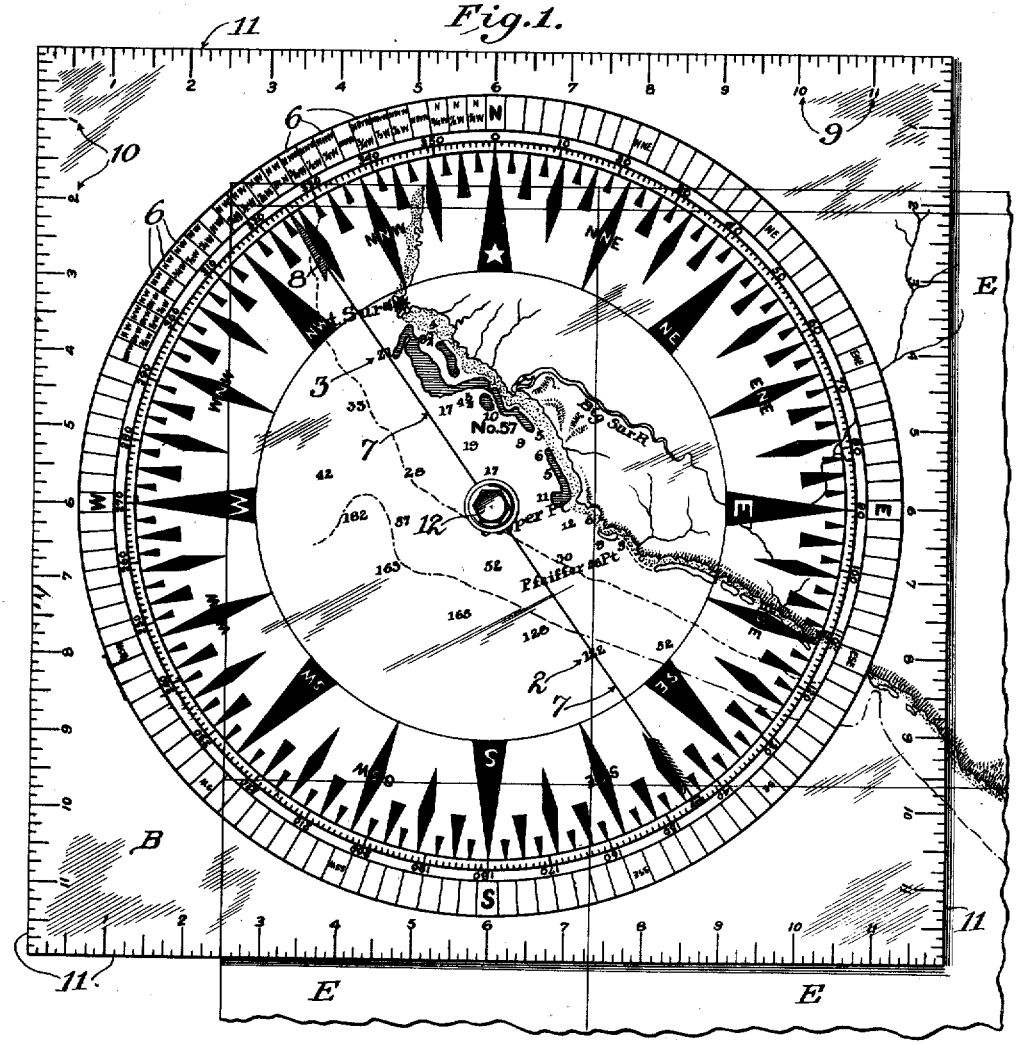
Figure 1 is a plan view of the instrument placed set for reading on a common mariner's chart.
Figure 2:
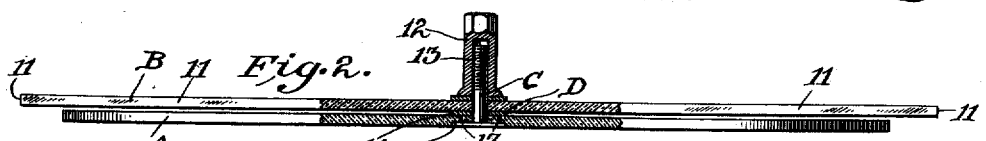
Figure 2 is a sectional view of the instrument.
Figure 3:
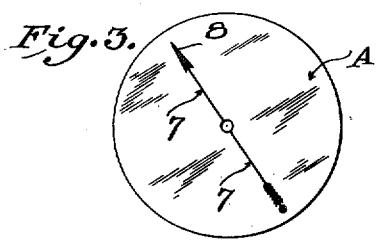
Figure 3 is a plan view of the lower member indicated at A.

A, as shown in Figures 1, 2 and 3 is a transparent disc having a line indicated at 7—7 in Figures 1 and 3, and an index 8, here indicated as an arrow the point of the index being of the same radial length as the angular gradations on the protractor upon B.

B is a rectangular, transparent, mariner's compass card having sides perpendicular to the North-South and East-West diameters, divisions 6 thereon upon which the compass points are depicted and marginal divisions 9 and pivoted at its center with disc A by means of a shaft running through member B, the said shaft fixed in A but having a bearing in B and a handle 12 fixed upon said shaft so that A can be held or turned without interference with the holding or turning of B when B is superposed over A.

Figure 4:
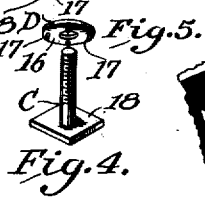
Figure 4 is a perspective view of shaft C.
Figure 5:
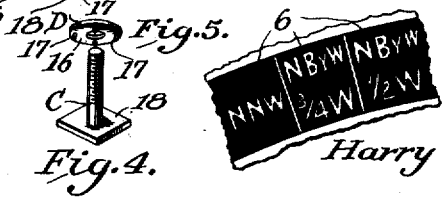
Figure 5 is an exposed perspective of washer D.
Figure 6:
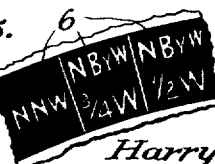
Figure 6 is an enlarged view of the compass point divisions.

Referring to Figures 4 and 5 in detail, 12 is shown as a hexagonal thumb cap nut to headed shaft 18 with threads 13 mating the threads of the shaft pin. The head 18 on shaft 13 being rectangular and embedding in the countersink on disc A and having friction tight washer 16 thereon which washer carries sharp points 17, can be readily and quickly assembled by pressing the parts together by hand. The thumb cap nut 12 by reason of the threads 13 will not press against the rectangular member B when pressure is exerted downward on the cap nut 12 but will press disc A against the chart leaving B to be freely turned.

To determine his course a navigator places his instrument on his chart which chart for the purpose of illustration herein is shown as E—E. The instrument is so placed that the arrow I will cut his present point and the point for which he is proceeding, which points are assumed for illustration, points 122 and 21 shown on the chart. Point 122 shown at 2, point 21 shown at 3 with line 7 crossing these points. He then by pressing upon the handle 12 secures the position of the disc A by friction upon the chart which renders the arrow line 7 immovably fixed upon points 21 and 122 and so that the arrow remains in alignment with them. He then turns the rectangular member B until the outward edges of B are parallel with the lines of longitude or latitude on the chart.

Divisions indicated 9 and 10 are parallel or vertical to the sides 11 of the rectangular member B and the sides of B are parallel to the tangents at lines dividing the quadrants of the compass card and therefore divisions 9 and 10 are parallel to the said tangents. These divisions 9 and 10 are numbered on opposed sides so that the eye quickly discerns when they are cut by lines on the chart.

As illustrated on the portion of the chart and shown when the arrow line crosses points 122 and 21 and the lines of B are parallel with the lines of latitude or longitude of this chart are arrow points to 325 degrees. The navigator knows the degree of variation in this region to be 15 degrees, therefore to a reading of 325 degrees he adds 15 degrees reaching a sum of 340 degrees which is his true angular course to be followed from point 122 to reach point 21. His eye has before him compass point graduations outward from the angular numerals so that instantaneously he is given his true compass course which as shown at 6 is N. by W. ¼ W. Thus the navigator is given his true course in both angular degrees and points of the compass.

The graduations 9 and 10 are spaced so as to conform to the scale of the chart and form a ready scale and take the place of a ruler which the navigator would otherwise require for measuring distance between points.

What I claim is:

1. A navigator's instrument comprising two superposed and relatively rotatable transparent members, the upper of said members having a compass card configuration depicted thereon and having parallel sides perpendicular to the North-South and East-West diameters of the compass respectively, said sides being graduated and said lower member having a single diametrical line with an index adjacent the divisions of the compass on said upper card, as and for the purposes set forth.

2. A navigator's instrument comprising a transparent flat member having a centrally located, fixed, vertical pivot and a single diametrical line passing through said pivot, a transparent compass card having parallel graduated sides perpendicular to the North-South and East-West diameters respectively, said compass card being rotatively mounted on said fixed pivot, as and for the purposes set forth.

In testimony whereof I affix my signature.

HARRY C. ROESER.